3,839,427
VICINAL HALOHYDROXYALKANE-PHOSPHONATES

Kenneth B. Moser and Frank Verbanac, Decatur, Ill., assignors to A. E. Staley Manufacturing Company, Decatur, Ill.
No Drawing. Continuation of abandoned application Ser. No. 694,091, Dec. 28, 1967. This application Oct. 12, 1970, Ser. No. 80,161
Int. Cl. C07f 9/02
U.S. Cl. 260—502.4 R          4 Claims

ABSTRACT OF THE DISCLOSURE

Vicinal halohydroxyalkanephosphonates prepared by reacting hypohalous acid with alkylenephosphonates.

DISCLOSURE OF THE INVENTION

This application is a continuation of application Ser. No. 694,091, now abandoned, entitled Vicinal Halohydroxyalkanephosphonates filed on Dec. 28, 1967 by Kenneth B. Moser et al.

This invention relates to vicinal halohydroxyalkanephosphonates and method of producing same.

Various organophosphorus compounds have been added to polymeric compositions as plasticizers, stabilizer, etc. Various other organophosphorus compounds, particularly those containing epoxy groups or free acid groups, have been reacted with suitable polymers, particularly alkyds, to reduce their flammability. The general object of this invention is to provide a new class of phosphorus compounds containing a reactive group.

A more specific object of this invention is to provide a new class of organophosphorus compounds capable of etherifying hydroxyl containing materials.

Another object of this invention is to provide a new class of organophosphorus compounds capable of etherifying alcohols, glycols, polyvinyl alcohol, cellulose, starch, etc.

We have now found that the objects of this invention can be attained with vicinal halohydroxyalkanephosphonates, particularly those having the structure:

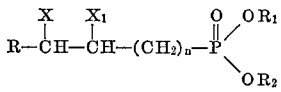

wherein R is selected from the group consisting of hydrogen and alkyl of 1 to 16 carbon atoms, $n$ is a number from 0 to 16 and the sum of $n$+the carbon atoms in R total from 0 to 16, $R_1$ and $R_2$ are hydrogen, alkyl groups of from 1 to 18 carbon atoms, substituted alkyl groups of from 1 to 18 carbon atoms, alkenyl of from 2 to 18 carbon atoms, hydrogen or M, wherein M is a cation selected from the group consisting of monovalent (alkali metal or ammonium) and divalent metal (alkaline earth metal) salts, X and $X_1$ are selected from the group consisting of halogen and hydroxy and are different.

The new compounds of this invention can be prepared readily by reacting a suitable alkylenephosphonate having 2 to 18 carbon atoms in the alkylene group (sometimes referred to as alkenylphosphonate) with hypohalous acid in an aqueous medium. Suitable alkylenephosphonates for use in this invention include ethylenephosphonic acid (commonly called vinylphosphonic acid), 2-propenephosphonic acid, oleylphosphonic acid, diethyl ethylenephosphonate, di(2-chloroethyl) vinylphosphonate, di(N,N,N-trimethylammonium ethyl chloride) ethylenephosphonate [prepared by quaternizing di(2 - chloroethyl) ethylenephosphonate with trimethyl amine], diallyl ethylenephosphonate, 3-butenephosphonic acid, distearyl ethylenephosphonate, etc.

Suitable hypohalous acids for use in this invention include hypochlorous acid and hypobromous acid. The hypohalous acid can be added directly to an aqueous solution or dispersion of alkylenephosphonate and/or generated *in situ* by the addition of diatomic halogen to the aqueous system. In general, the latter technique is preferred, particularly when chlorine is employed. In this case, the reaction can be followed visually by adding chlorine to reaction medium until the reaction medium turns a yellow green color. The yellow green color indicates that substantially all of the ethylenically unsaturated double bonds in the alkylenephosphonate have been substituted with vicinal chlorohydroxy groups and the reaction can be terminated.

Generally, about one mole of hypohalous acid is added or generated *in situ* in the reaction medium per equivalent of unsaturation in the alkylenephosphonate. If the alkylenephosphonate contains unsaturation in the ester moiety this unsaturation is also converted to halohydroxy groups. For example, about three moles of hypohalous acid reacts with one mole of diallyl ethylenephosphonate to form di(2,3 - halohydroxypropyl) halohydroxyethanephosphonate.

This process can be carried out at a temperature of about 0° C. to about 70 or 80° C., but is preferably carried out at a temperature well below the boiling point of the hypohalous acid, i.e., 0 to 40° C.

The resultant vicinal hydroxyhaloalkanephosphonates can be purified by conventional means or used without purification. In either case, they react readily with hydroxy compounds of the type described above. The derivatives formed by reacting starch and/or cellulose with said reagents are particularly useful as beater additives in the preparation of paper from acid furnishes. If desired, the vicinal halohydroxyalkanephosphonates can be cyclized into the corresponding vicinal epoxyalkanephosphonates by treating same with strong aqueous alkali, such as strong sodium hydroxide, and used as stabilizers and/or plasticizers of polyvinyl chloride and/or polyvinylidene chloride.

The examples following are merely illustrative and should not be construed as limiting the scope of this invention.

Example I

Diethyl chlorohydroxyethanephosphonate was prepared by sparging 164.2 grams diethyl vinylphosphonate (1 mole) dissolved in 640 ml. of distilled water with about 72 grams chlorine for 1½ hours while cooling the reaction mass at about 15 to 30° C. The reaction was terminated when the solution turned yellow and then sparged with air until colorless. The solution was adjusted to pH 5.0 with aqueous sodium hydroxide, extracted once with 200 ml. methylene chloride and four times with 100 ml. portions of methylene chloride. The extracts were combined, dried over sodium sulfate, concentrated by distilling off methylene chloride, and fractionally vacuum distilled. Vacuum distillation of the residue at 105° C./0.34 mm. to 105.5° C./0.35 mm. yielded 118.7 grams of diethyl chlorohydroxyethanephosphonate containing 33.04% C (33.27% theoretical), 6.08% H (6.51% theoretical), 14.09% P (14.30% theoretical) and 16.56% Cl (16.37% theoretical).

Example II

This example illustrates the preparation of diethyl vicinal 2,3-chlorohydroxypropanephosphonate. Example I was repeated with essentially the same results except that diethyl vinylphosphonate was replaced with an equivalent concentration of diethyl 2-propenephosphonate.

Example III

This example illustrates the preparation of vicinal chlorohydroxyethanephosphonic acid. Twenty and one-half ml. of water was added dropwise into 79.6 grams vinylphosphonic acid dichloride (0.549 mole) dissolved in 200 ml. of methylene chloride, while maintaining the reaction at 15° C. Vinylphosphonic acid was separated from the reaction vessel by decanting off the upper layer of methylene chloride. The lower layer containing vinylphosphonic acid was subjected to a vacuum in order to remove residual hydrogen chloride and methylene chloride. The syrupy product, which weighed 50.8 grams, was dissolved in 458 ml. water and the solution cooled in a water bath at about 15 to 20° C. while 40.4 grams of chlorine gas was sparged into it until a yellow color persisted in the solution (about 30 minutes). The resultant solution was sparged with air until the solution was clear. Analysis indicated that approximately 97% by weight of the vinylphosphonic acid had been converted into vicinal chlorohydroxyethanephosphonic acid.

Since many embodiments of this invention may be made and since many changes may be made in the embodiments described, the foregoing is to be interpreted as illustrative and our invention is defined by the claims appended hereafter.

We claim:

1. A vicinal halohydroxyalkanephosphorous compound having the structure:

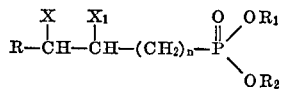

wherein R is selected from the group consisting of hydrogen and alkyl of 1 to 16 carbon atoms; $n$ is a number from 0 to 16 and the sum of $n$ plus the carbon atoms in R total from 0 to 16; $R_1$ and $R_2$ are selected from the group consisting of hydrogen, alkali metal ion, ammonium ion and alkaline earth metal ion; and X and $X_1$ are selected from the group consisting of halogen and hydroxyl and are different.

2. A vicinal halohydroxyalkanephosphorous compound having the structure:

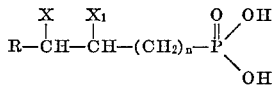

wherein R is selected from the group consisting of hydrogen and alkyl of 1 to 16 carbon atoms; $n$ is a number from 0 to 16 and the sum of $n+$the carbon atoms in R total from 0 to 16 and X and $X_1$ are selected from the group consisting of halogen and hydroxyl and are different.

3. The compound of claim 2 wherein said halohydroxyalkanephosphorous compound is vicinal chlorohydroxyethanephosphonic acid.

4. The compound of claim 2 wherein said halohydroxyalkanephosphorous compound is vicinal chlorohydroxypropanephosphonic acid.

References Cited

UNITED STATES PATENTS

| | | | |
|---|---|---|---|
| 3,649,619 | 3/1972 | Pollak et al. | 260—953 X |
| 3,657,282 | 4/1972 | Christensen et al. | 260—953 X |
| 2,579,810 | 12/1951 | Fields | 260—953 X |
| 2,899,456 | 8/1959 | Rosin et al. | 260—953 X |

OTHER REFERENCES

Wagner et al., "Synthetic Organic Chemistry," 1953, J. Wiley and Sons, N.Y., pp. 109–110.

JOSEPH PAUL BRUST, Primary Examiner

U.S. Cl. X.R.

260—953, 986